United States Patent
Hsu et al.

(10) Patent No.: US 9,213,457 B2
(45) Date of Patent: Dec. 15, 2015

(54) DRIVING METHOD FOR TOUCH PANEL AND TOUCH CONTROL SYSTEM

(71) Applicant: Chunghwa Picture Tubes, Ltd., Taoyuan (TW)

(72) Inventors: Chao-Yong Hsu, Taoyuan County (TW); Hung-Hsiang Chen, Taoyuan County (TW); Shih-Hung Huang, Taoyuan County (TW)

(73) Assignee: Chunghwa Picture Tubes, Ltd., Longtan Dist., Taoyuan (TW)

( * ) Notice: Subject to any disclaimer, the term of this patent is extended or adjusted under 35 U.S.C. 154(b) by 0 days.

(21) Appl. No.: 14/270,363

(22) Filed: May 6, 2014

(65) Prior Publication Data

US 2015/0185901 A1    Jul. 2, 2015

(30) Foreign Application Priority Data

Dec. 30, 2013    (TW) .............................. 102149106 A

(51) Int. Cl.
*G06F 3/044*    (2006.01)
*G06F 3/041*    (2006.01)

(52) U.S. Cl.
CPC .............. *G06F 3/044* (2013.01); *G06F 3/0416* (2013.01)

(58) Field of Classification Search
CPC ................................ G06F 3/044; G06F 3/0416
See application file for complete search history.

(56) References Cited

U.S. PATENT DOCUMENTS

| | | | |
|---|---|---|---|
| 8,600,698 B2 * | 12/2013 | Chang et al. | 702/150 |
| 2013/0335365 A1 * | 12/2013 | Kim et al. | 345/174 |
| 2013/0342506 A1 * | 12/2013 | Westhues et al. | 345/174 |

FOREIGN PATENT DOCUMENTS

| | | |
|---|---|---|
| EP | 2 650 762 A2 | 10/2013 |
| TW | 201308175 | 2/2013 |
| TW | 201426435 | 7/2014 |

* cited by examiner

*Primary Examiner* — Andrew Sasinowski
(74) *Attorney, Agent, or Firm* — Winston Hsu; Scott Margo

(57) ABSTRACT

A driving method for touch panel includes providing a plurality of driving signals with a first voltage level to a plurality of sensing electrodes of a touch panel; receiving a plurality of sensing signals corresponding to the plurality of driving signals with the first voltage level from the plurality of sensing electrodes of the touch panel; obtaining a second voltage level according to the plurality of sensing signals, the second voltage level being different from the first voltage level; and providing a plurality of driving signals with the second voltage level to the plurality of sensing electrodes of the touch panel.

11 Claims, 6 Drawing Sheets

DRIVING METHOD FOR TOUCH PANEL AND TOUCH CONTROL SYSTEM

BACKGROUND OF THE INVENTION

1. Field of the Invention

The present invention relates to a driving method for touch panel and a touch control system, and more particularly, to a driving method for touch panel and a touch control system capable of improving detection accuracy and reducing power consumption.

2. Description of the Prior Art

As related techniques keep improving, portable electronic products, such as a mobile phone comprises a touch panel utilized as an input interface. Generally, the touch panel can be a capacitive touch panel or a resistive touch panel. During operation of the capacitive touch panel, capacitance values on the touch panel are changed when a finger or a conductive object approaches or touches the touch panel. When a change of the capacitance value is detected, a touch position of a touch point can be determined, and an operation corresponding to the touch point is further performed. When a touch object on the touch panel is different, the change of capacitance value of the touch panel corresponding to the touch object is different accordingly. However, in the prior art, a voltage level of a driving signal of the touch panel is fixed. When a voltage level of the driving signal of the touch panel is higher, power consumption of the touch panel is increased; and when the voltage level of the driving signal of the touch panel is lower, the touch point of the touch panel may not be correctly detected due to insufficient voltage, so as to reduce detection accuracy of the touch panel.

SUMMARY OF THE INVENTION

The present invention provides a driving method for touch panel, comprising providing a plurality of driving signals with a first voltage level to a plurality of sensing electrodes of a touch panel; receiving a plurality of sensing signals corresponding to the plurality of driving signals with the first voltage level from the plurality of sensing electrodes of the touch panel; obtaining a second voltage level according to the plurality of sensing signals, the second voltage level being different from the first voltage level; and providing a plurality of driving signals with the second voltage level to the plurality of sensing electrodes of the touch panel.

The present invention further provides a touch control system, comprising a touch panel, a driving voltage supplying unit, and a processing unit. The touch panel comprises a plurality of sensing electrodes. The driving voltage supplying unit is for providing a plurality of driving signals with a first voltage level to the plurality of sensing electrodes of the touch panel in a predetermined state. The processing unit is for receiving a plurality of sensing signals corresponding to the plurality of driving signals with the first voltage level from the plurality of sensing electrodes of the touch panel, obtaining a second voltage level according to the plurality of sensing signals, and controlling the driving voltage supplying unit to provide a plurality of driving signals with the second voltage level to the plurality of sensing electrodes of the touch panel. Wherein, the second voltage level is different from the first voltage level.

In contrast to the prior art, the driving method for touch panel and the touch control system of the present invention can selectively provide driving signals with different voltage levels to the touch panel according to characteristics of a touch object. When the touch panel is more sensitive to the touch object, the voltage level of the driving signal can be decreased in order to reduce the power consumption of the touch control system. When the touch panel is less sensitive to the touch object, the voltage level of the driving signal is increased in order to improve the detection accuracy of the touch control system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
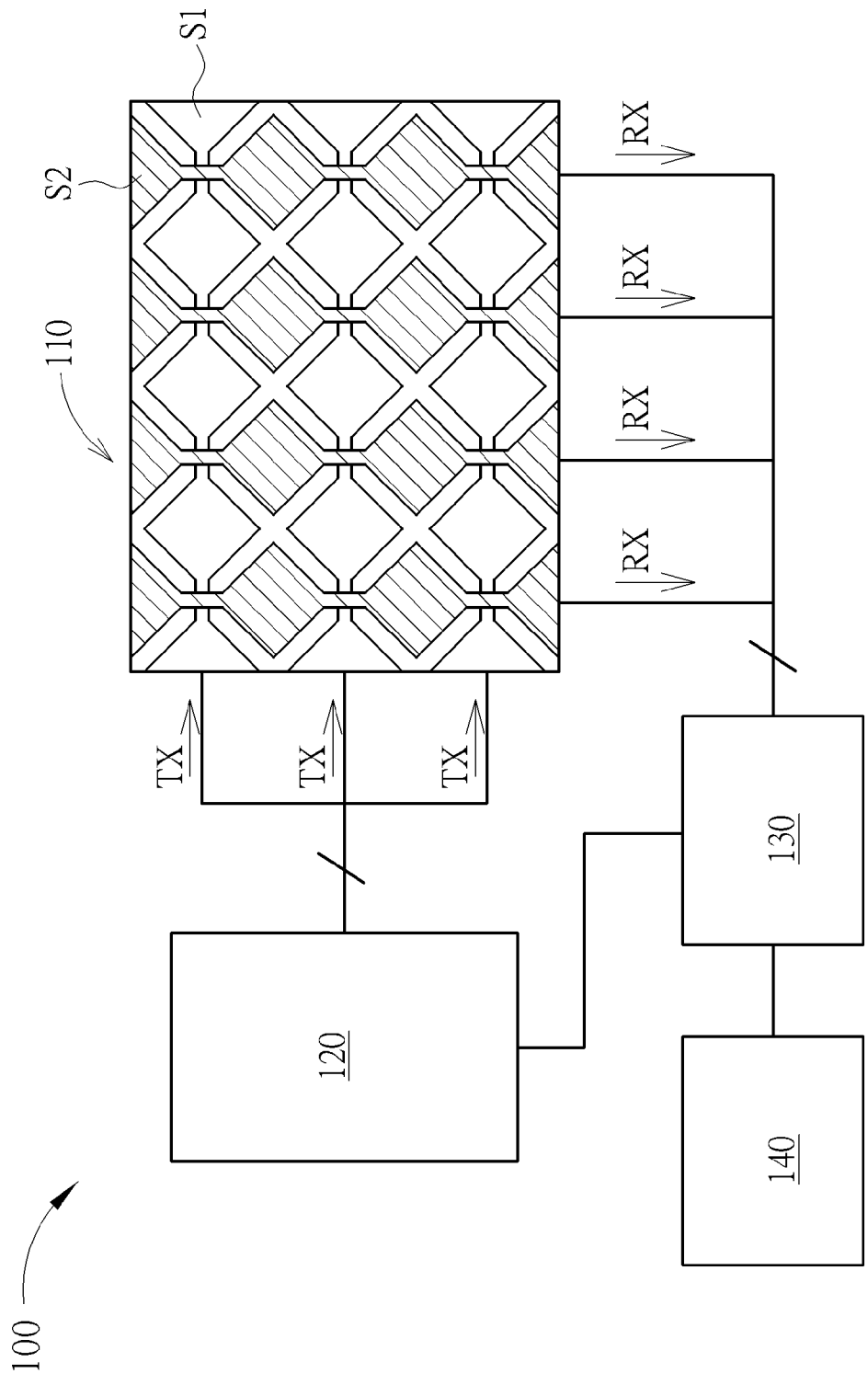
FIG. 1 is a diagram showing a first embodiment of a touch control system of the present invention.

Please refer to FIG. 1. FIG. 1 is a diagram showing a first embodiment of a touch control system of the present invention. As shown in FIG. 1, the touch control system 100 of the present invention comprises a touch panel 110, a driving voltage supplying unit 120, and a processing unit 130. The touch panel 110 comprises a plurality of first sensing electrodes S1 arranged along a first direction and a plurality of second sensing electrodes S2 arranged along a second direction. The driving voltage supplying unit 120 is for providing a plurality of driving signals TX to the plurality of first sensing electrodes S1 of the touch panel 110 respectively. The processing unit 130 is for receiving a plurality of sensing signals RX corresponding to the plurality of driving signals TX from the plurality of second sensing electrodes S2 of the touch panel 110, and controlling a voltage level of the driving signals TX provided by the driving voltage supplying unit 120 according to the plurality of sensing signals RX.

Figure 2:
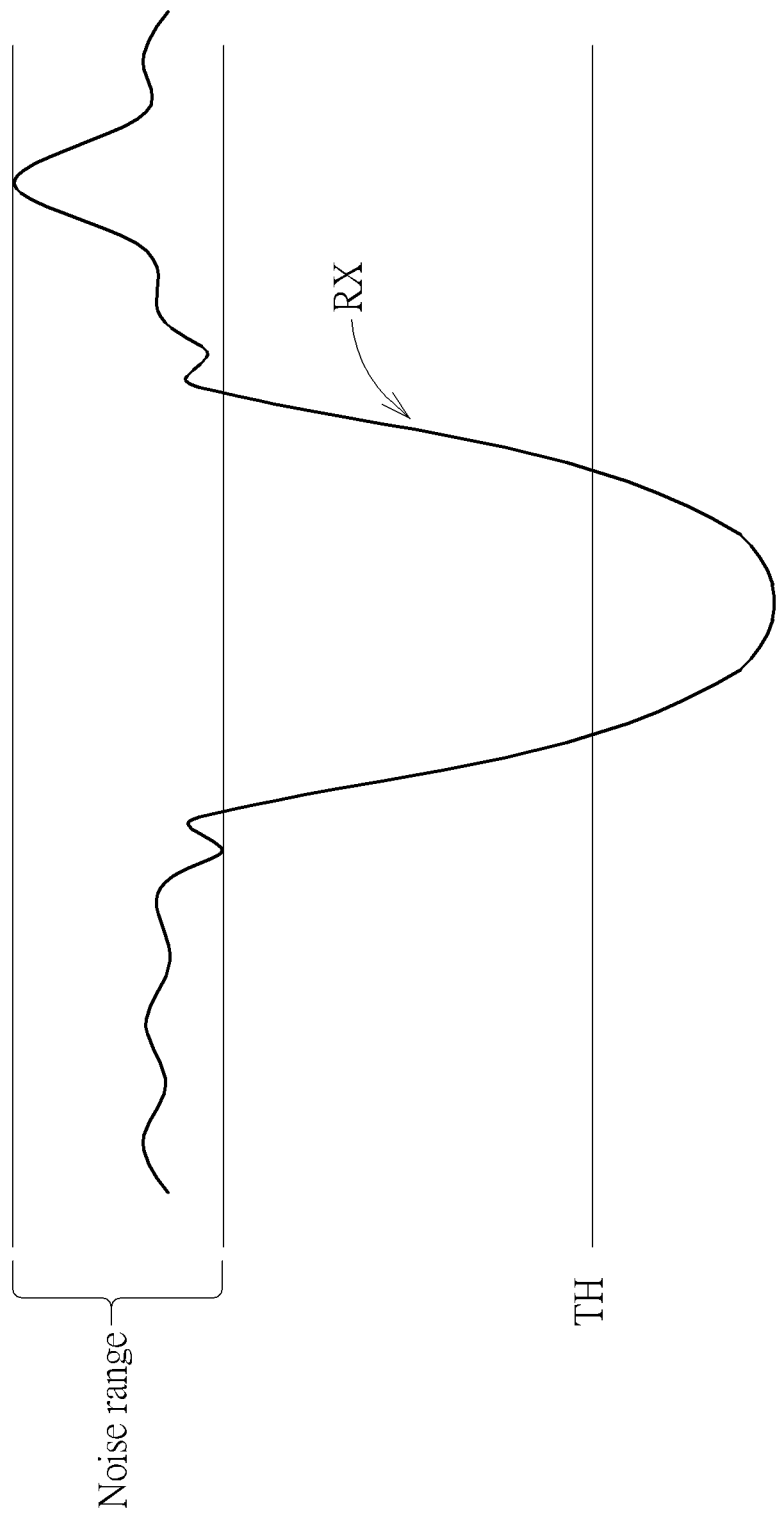
FIG. 2 is a diagram showing a waveform of a sensing signal of a touch point of the touch control system in FIG. 1.

For example, when the touch control system 100 is in a predetermined state (such as in an initial state), the driving voltage supplying unit 120 provides the plurality of driving signals TX with a first voltage level to the first sensing electrodes S1 of the touch panel 110. The plurality of driving signals TX with the first voltage level can ensure the touch control system 100 to accurately detect a touch point of any kind of a touch object (such as a finger or a touch pen) on the touch panel 110. When the processing unit 130 receives the plurality of sensing signals RX corresponding to the plurality of driving signals TX from the second sensing electrodes S2 of the touch panel 110, the processing unit 130 determines the touch point according to a touch threshold value TH of the touch panel 110 and the plurality of sensing signals RX. Please refer to FIG. 2, and refer to FIG. 1 as well. FIG. 2 is a diagram showing a waveform of the sensing signal of the touch point of the touch control system in FIG. 1. As shown in FIG. 2, the sensing signal RX corresponds to a change of a capacitance value of the touch panel 110. Since the touch control system 100 in FIG. 1 is a mutual capacitance touch control system, the capacitance value of the touch point is lower than others. When the sensing signal RX is dropped to a value lower than the touch threshold value TH, the processing unit 130 determines a position corresponding to the dropped sensing signal RX is the touch point.

When a difference between a relative minimum value of the sensing signal RX and the touch threshold value TH is greater than a predetermined value, it means that the touch panel 110 is more sensitive to the touch object. Therefore, the processing unit 130 can obtain a second voltage level, which is lower than the first voltage level, according to the difference between the relative minimum value of the sensing signal RX and the touch threshold value TH, and the processing unit 130 then controls the driving voltage supplying unit 120 to provide the plurality of driving signals TX with the second voltage level to the first sensing electrodes S1 of the touch panel 110 for performing touch sensing operation. Thereby, power consumption of the touch control system 100 can be reduced.

When the difference between the relative minimum value of the sensing signal RX and the touch threshold value TH is less than the predetermined value, it means that the touch panel 110 is less sensitive to the touch object. The touch panel 110 may not correctly detect the touch point of the touch object. Therefore, the processing unit 130 can obtain a second voltage level, which is higher than the first voltage level, according to the difference between the relative minimum value of the sensing signal RX and the touch threshold value TH, and the processing unit 130 then controls the driving voltage supplying unit 120 to provide the plurality of driving signals TX with the second voltage level to the first sensing electrodes S1 of the touch panel 110 for performing touch sensing operation. Thereby, detection accuracy of the touch control system 100 can be improved.

On the other hand, the processing unit 130 can also obtain the second voltage level according to a touched area of the touch point. For example, when a size of the touched area of the touch point is larger, it means that the touch object is possible to be a finger, and the touch panel 110 is more sensitive to the finger. Therefore, the processing unit 130 can obtain the second voltage level, which is lower than the first voltage level, according to the touched area of the touch point, and the processing unit 130 then controls the driving voltage supplying unit 120 to provide the plurality of driving signals TX with the second voltage level to the first sensing electrodes S1 of the touch panel 110 for performing touch sensing operation. Thereby, the power consumption of the touch control system 100 can be reduced.

When the size of the touched area of the touch point is smaller, it means that the touch object is possible to be a touch pen, and the touch panel 110 is less sensitive to the touch pen. Therefore, the processing unit 130 can obtain the second voltage level, which is higher than the first voltage level, according to the touch area of the touch point, and the processing unit 130 then controls the driving voltage supplying unit 120 to provide the plurality of driving signals TX with the second voltage level to the first sensing electrodes S1 of the touch panel 110 for performing touch sensing operation. Thereby, the detection accuracy of the touch control system 100 can be improved.

In addition, the touch control system 100 of the present invention can further comprise a memory 140 for storing a lookup table. The processing unit 130 can obtain a corresponding second voltage level directly in the lookup table according to the sensing signal RX.

Figure 3:
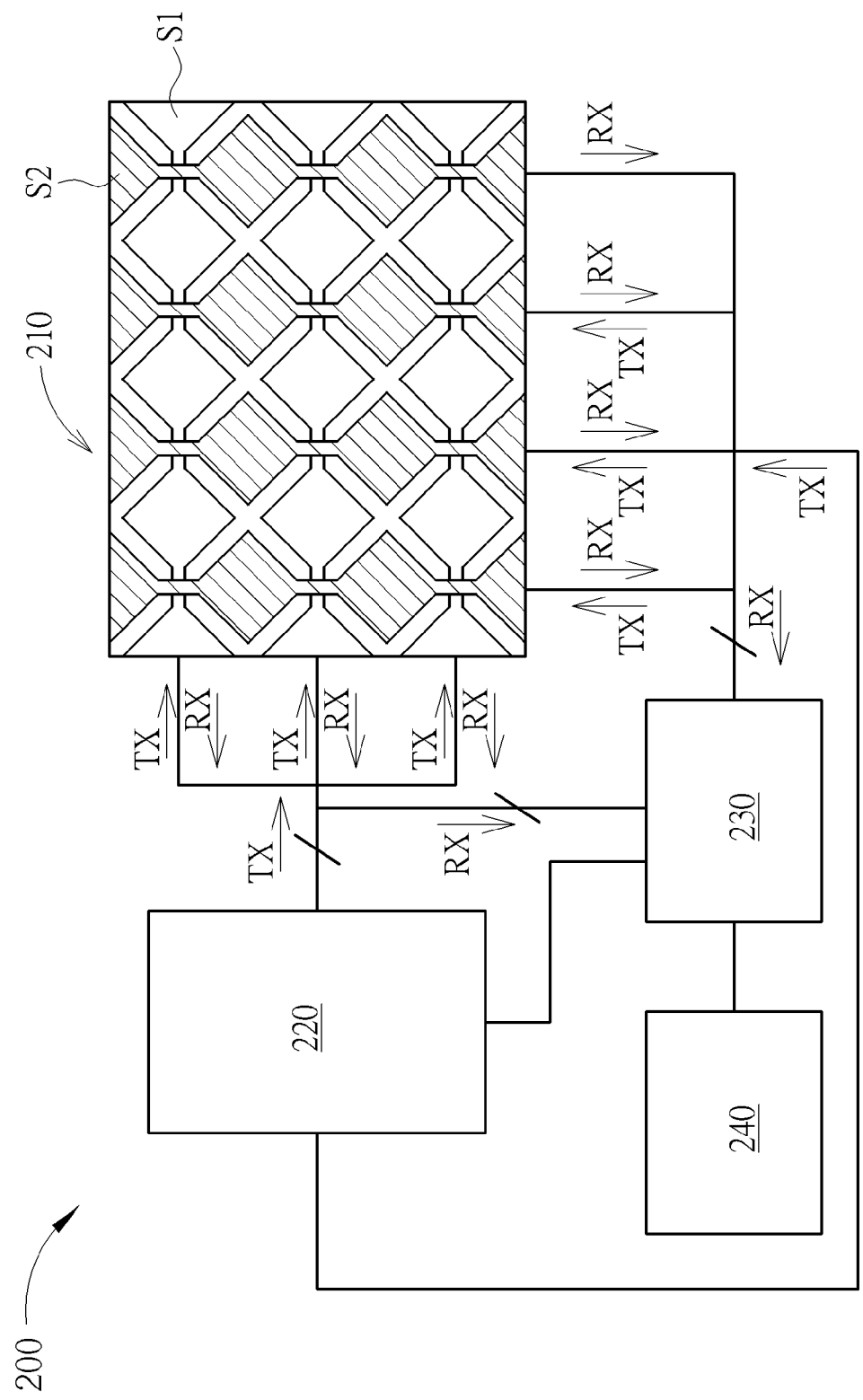
FIG. 3 is a diagram showing a second embodiment of the touch control system of the present invention.

Please refer to FIG. 3. FIG. 3 is a diagram showing a second embodiment of the touch control system of the present invention. As shown in FIG. 3, the touch control system 200 of the present invention comprises a touch panel 210, a driving voltage supplying unit 220, and a processing unit 230. Different from the first embodiment in FIG. 1, the touch control system 200 in FIG. 3 is a self-capacitance touch control system. Therefore, the driving voltage supplying unit 220 sequentially provides the plurality of driving signals TX to the first sensing electrodes S1 and second sensing electrodes S2, and the processing unit 230 then receives the plurality of sensing signals RX from the first electrodes S1 and the second sensing electrodes S2.

Figure 4:
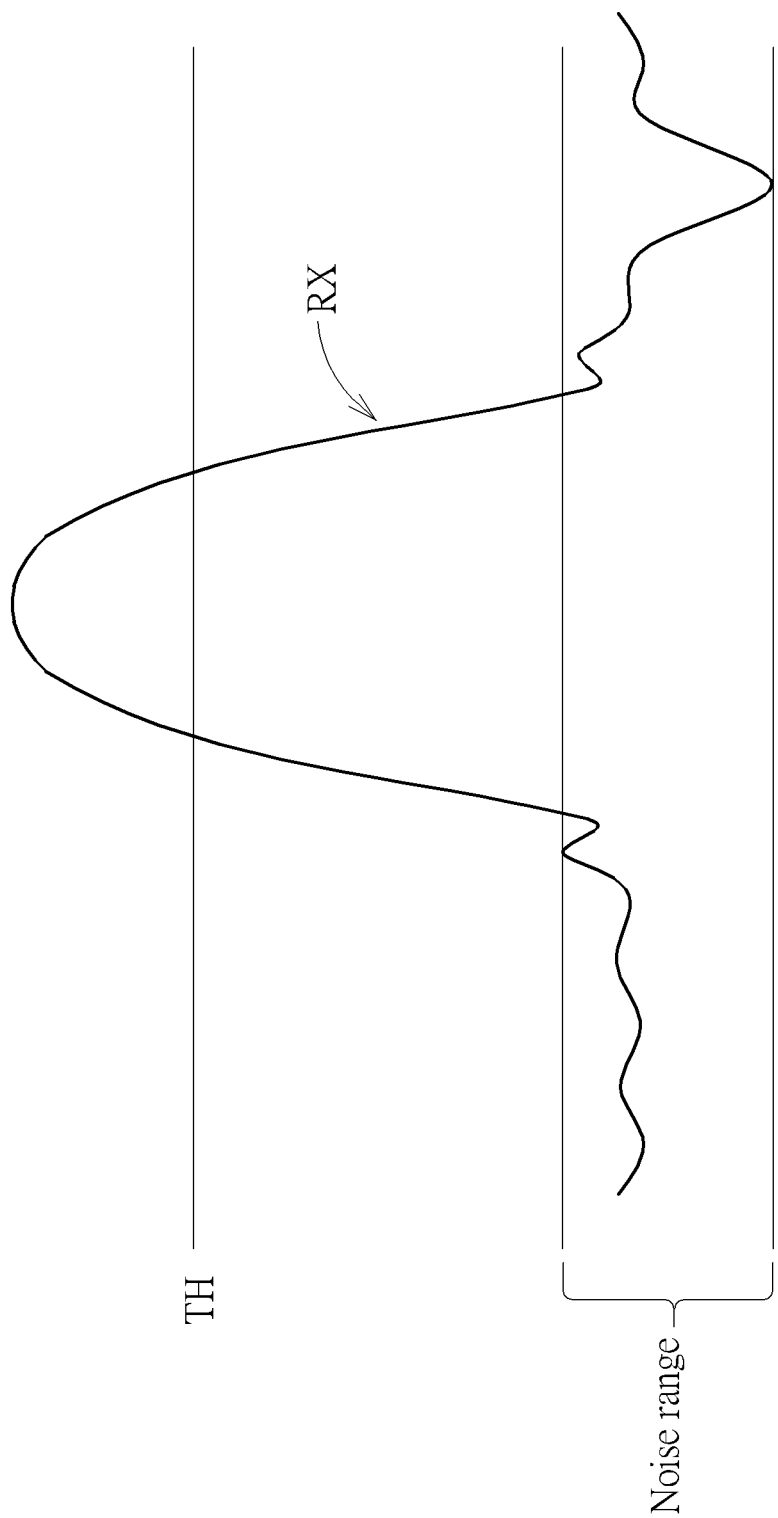
FIG. 4 is a diagram showing a waveform of a sensing signal of a touch point of the touch control system in FIG. 3.

Similarly, when the touch control system 200 is in a predetermined state (such as in an initial state), the driving voltage supplying unit 220 sequentially provides the plurality of driving signals TX with the first voltage level to the first sensing electrodes S1 and the second sensing electrodes S2 of the touch panel 210. The plurality of driving signals TX with the first voltage level can ensure the touch control system 200 to accurately detect a touch point of any kind of a touch object (such as a finger or a touch pen) on the touch panel 210. When the processing unit 230 receives the plurality of sensing signals RX corresponding to the plurality of driving signals TX from the first sensing electrodes S1 and the second sensing electrodes S2 of the touch panel 210, the processing unit 230 determines the touch point according to a touch threshold value TH of the touch panel 210 and the plurality of sensing signals RX. Please refer to FIG. 4, and refer to FIG. 3 as well. FIG. 4 is a diagram showing a waveform of a sensing signal of a touch point of the touch control system in FIG. 3. As shown in FIG. 4, the sensing signal RX corresponds to a change of a capacitance value of the touch panel 210. Since the touch control system 200 in FIG. 3 is a self-capacitance touch control system, the capacitance value of the touch point is higher than others. When the sensing signal RX is risen to a value higher than the touch threshold value TH, the processing unit 230 determines a position corresponding to the risen sensing signal RX is the touch point.

When a difference between a relative maximum value of the sensing signal RX and the touch threshold value TH is greater than a predetermined value, it means that the touch panel 210 is more sensitive to the touch object. Therefore, the processing unit 230 can obtain a second voltage level, which is lower than the first voltage level, according to the difference between the relative maximum value of the sensing signal RX and the touch threshold value TH, and the processing unit 230 then controls the driving voltage supplying unit 220 to provide the plurality of driving signals TX with the second voltage level to the first sensing electrodes S1 and the second sensing electrodes S2 of the touch panel 210 for performing touch sensing operation. Thereby, the power consumption of the touch control system 200 can be reduced.

When the difference between a relative maximum value of the sensing signal RX and the touch threshold value TH is less than the predetermined value, it means that the touch panel 210 is less sensitive to the touch object. The touch panel 210 may not correctly detect the touch point of the touch object. Therefore, the processing unit 230 can obtain the second voltage level, which is higher than the first voltage level, according to the difference between the relative maximum value of the sensing signal RX and the touch threshold value TH, and the processing unit 230 then controls the driving voltage supplying unit 220 to provide the plurality of driving signals TX with the second voltage level to the first sensing electrodes S1 and the second sensing electrodes S2 of the touch panel 210 for performing touch sensing operation. Thereby, the detection accuracy of the touch control system 200 can be improved.

Similarly, the processing unit 230 can also obtain the second voltage level according to a size of touched area of the touch point. The way that of obtaining the second voltage level according to the touched area of the touch point is identical to that in the first embodiment, thus, no illustration is further provided. In addition, the touch control system 200 of the present invention can also comprise a memory 240 for storing a lookup table. The processing unit 230 can obtain a corresponding second voltage level directly in the lookup table according to the sensing signal RX.

In the above embodiment, the sensing signal RX corresponds to the change of the capacitance value of the touch panel. However, the sensing signal RX also can correspond to a change of a voltage value of the touch panel, or any other type of signal.

On the other hand, the processing unit 130, 230 can adjust the touch threshold value TH of the touch panel. For example, as shown in FIG. 2 and FIG. 4, the processing unit 130, 230 can obtain a noise range according to the plurality of received sensing signals RX. The processing unit 130, 230 can further adjust the touch threshold value of the touch panel according to a difference between the touch threshold value TH and the noise range. When the difference between the touch threshold value TH and the noise range is greater than a predetermined value, the processing unit 130, 230 can adjust the touch threshold value TH to be slightly closer to the noise range, so that the voltage level of the driving signals TX can be further lowered in order to reduce the power consumption of the touch control system.

Figure 5:
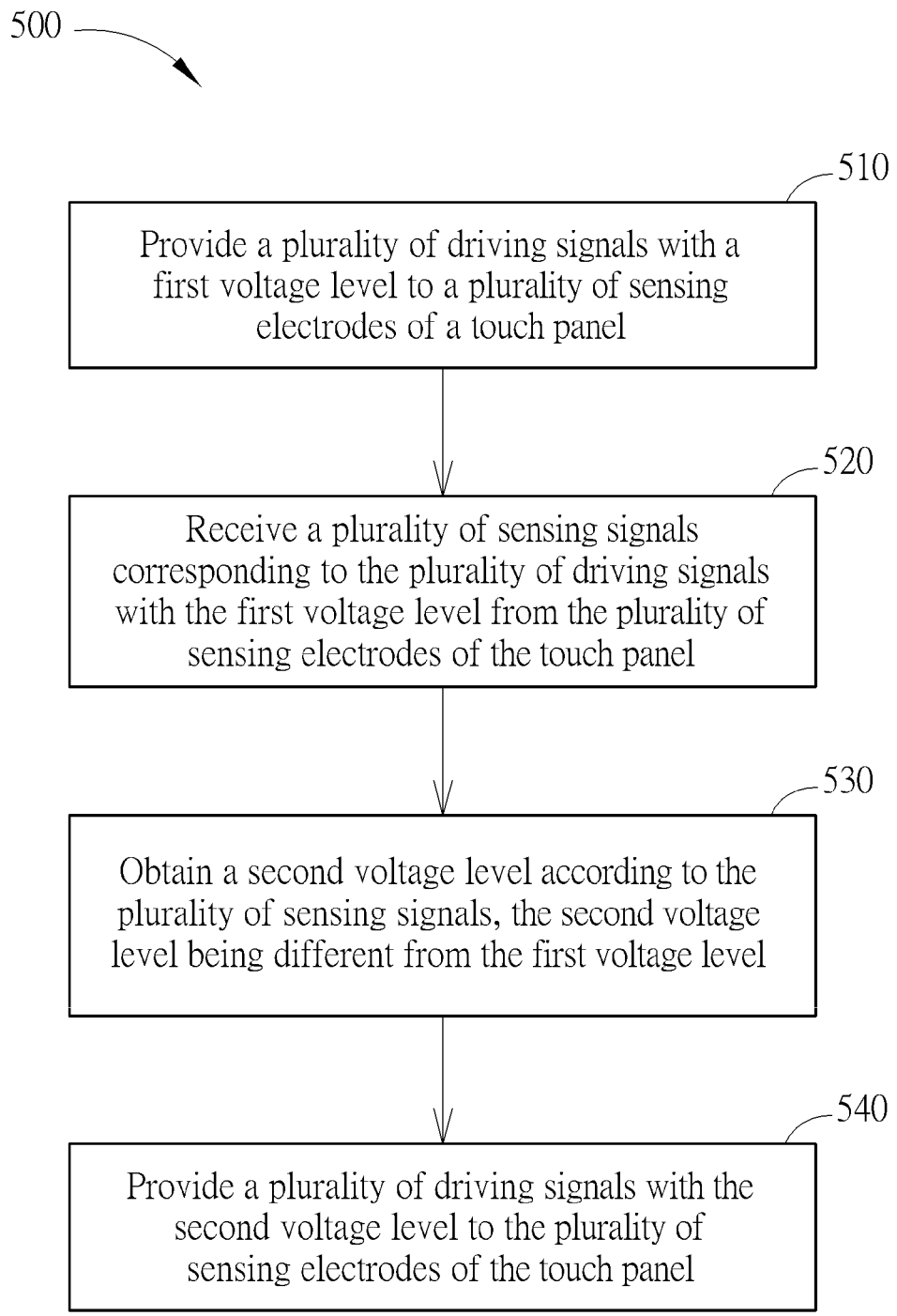
FIG. 5 is a flowchart showing a driving method for touch panel of the present invention.

Please refer to FIG. 5. FIG. 5 is a flowchart 500 showing a driving method for touch panel of the present invention. The flowchart of the driving method for touch panel of the present invention comprises the following steps:

Step 510: Provide a plurality of driving signals with a first voltage level to a plurality of sensing electrodes of a touch panel;

Step 520: Receive a plurality of sensing signals corresponding to the plurality of driving signals with the first voltage level from the plurality of sensing electrodes of the touch panel;

Step 530: Obtain a second voltage level according to the plurality of sensing signals, the second voltage level being different from the first voltage level; and Step 540: Provide a plurality of driving signals with the second voltage level to the plurality of sensing electrodes of the touch panel.

Figure 6:
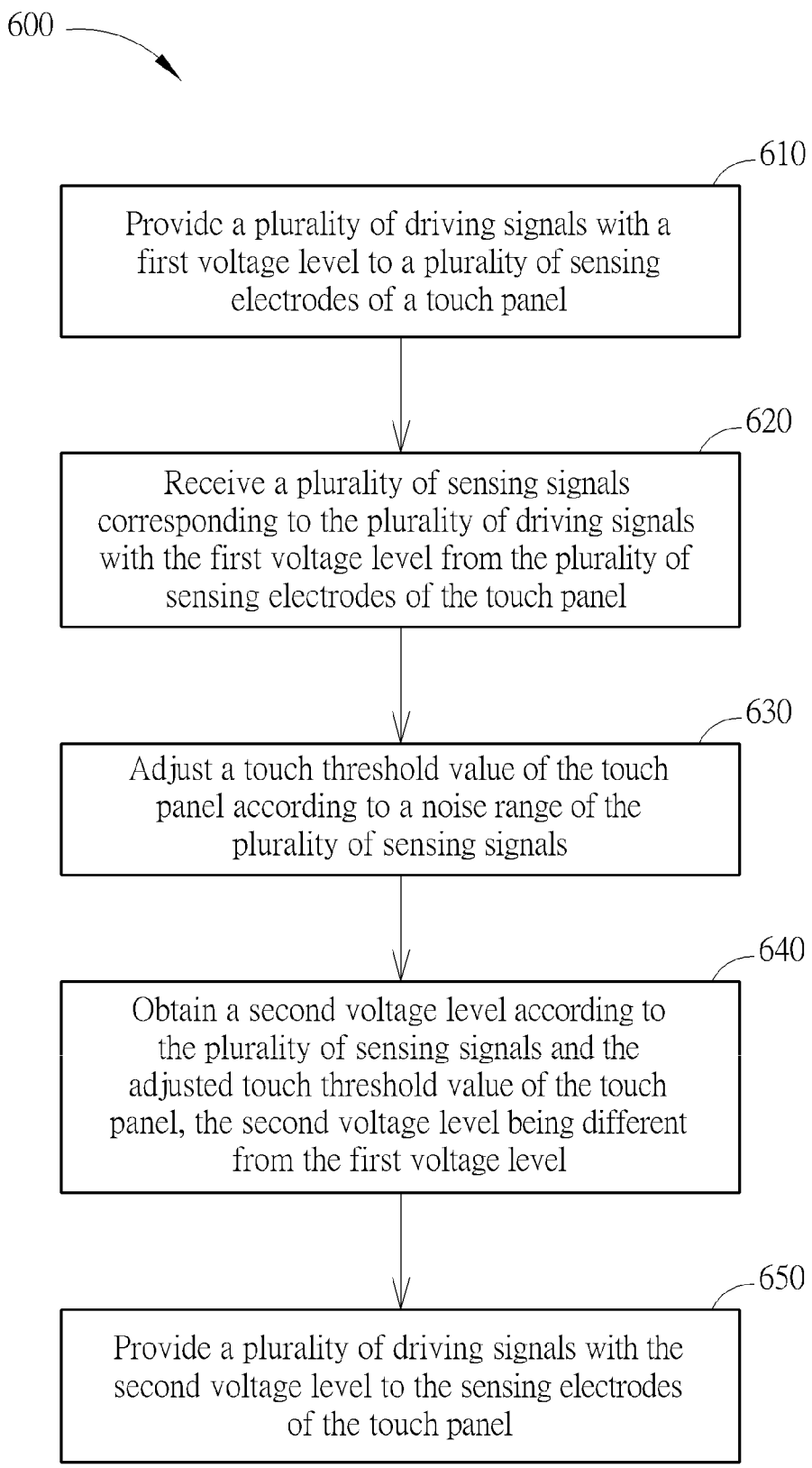
FIG. 6 is a flowchart showing another driving method for touch panel of the present invention.

Please refer to FIG. 6. FIG. 6 is a flowchart 600 showing another driving method for touch panel of the present invention. The flowchart of another driving method for touch panel of the present invention comprises the following steps:

Step 610: Provide a plurality of driving signals with a first voltage level to a plurality of sensing electrodes of a touch panel;

Step 620: Receive a plurality of sensing signals corresponding to the plurality of driving signals with the first voltage level from the plurality of sensing electrodes of the touch panel;

Step 630: Adjust a touch threshold value of the touch panel according to a noise range of the plurality of sensing signals;

Step 640: Obtain a second voltage level according to the plurality of sensing signals and the adjusted touch threshold value of the touch panel, the second voltage level being different from the first voltage level; and Step 650: Provide a plurality of driving signals with the second voltage level to the sensing electrodes of the touch panel.

In contrast to the prior art, the driving method for touch panel and the touch control system of the present invention can selectively provide driving signals with different voltage levels to the touch panel according to characteristics of a touch object. When the touch panel is more sensitive to the touch object, the voltage level of the driving signal can be decreased in order to reduce the power consumption of the touch control system. When the touch panel is less sensitive to the touch object, the voltage level of the driving signal is increased in order to improve the detection accuracy of the touch control system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving method for touch panel, comprising:
providing a plurality of driving signals with a first voltage level to a plurality of sensing electrodes of a touch panel by a driving voltage supplying unit;
receiving a plurality of sensing signals corresponding to the plurality of driving signals with the first voltage level from the plurality of sensing electrodes of the touch panel;
obtaining a second voltage level according to the plurality of sensing signals for updating the plurality of driving signals by a processing unit coupled to the driving voltage supplying unit, the second voltage level being different from the first voltage level; and
providing a plurality of driving signals with the second voltage level generated by updating the plurality of driving signals with the first voltage level to the plurality of sensing electrodes of the touch panel;
wherein detection accuracy is improved when the second voltage level is higher than the first voltage level, and power consumption is reduced when the second voltage level is lower than the first voltage level.

2. The driving method of claim 1, further comprising:
determining a touch point according to a touch threshold value of the touch panel and the plurality of sensing signals;
wherein obtaining the second voltage level according to the plurality of sensing signals, is obtaining the second voltage level according to the touch threshold value and relative extreme values of the plurality of sensing signals of the touch point.

3. The driving method of claim 1, further comprising:
determining a touch point according to a touch threshold value of the touch panel and the plurality of sensing signals;
wherein obtaining the second voltage level according to the plurality of sensing signals, is obtaining the second voltage level according to a touched area of the touch point.

4. The driving method of claim 1, further comprising:
adjusting a touch threshold value of the touch panel according to a noise range of the plurality of sensing signals.

5. The driving method of claim 4, wherein obtaining the second voltage level according to the plurality of sensing signals comprises:
obtaining the second voltage level according to the plurality of sensing signals and the adjusted touch threshold value of the touch panel.

6. A touch control system, comprising:
a touch panel, comprising a plurality of sensing electrodes;
a driving voltage supplying unit for providing a plurality of driving signals with a first voltage level to the plurality of sensing electrodes of the touch panel in a predetermined state; and a processing unit coupled to the driving voltage supplying unit, for receiving a plurality of sensing signals corresponding to the plurality of driving signals with the first voltage level from the sensing electrodes of the touch panel, obtaining a second voltage level according to the plurality of sensing signals for updating the plurality of driving signals, and controlling the driving voltage supplying unit to provide a plurality of driving signals with the second voltage level generated by updating the plurality of driving signals with the first voltage level to the sensing electrodes of the touch panel;

wherein the second voltage level is different from the first voltage level;

detection accuracy is improved when the second voltage level is higher than the first voltage level, and power consumption is reduced when the second voltage level is lower than the first voltage level.

7. The touch control system of claim 6, wherein the processing unit obtains the second voltage level according to a touch threshold value and relative extreme values of the plurality of sensing signals of the touch point.

8. The touch control system of claim 6, wherein the processing unit obtains the second voltage level according to a touched area of the touch point.

9. The touch control system of claim 6, wherein the processing unit is further configured to adjust a touch threshold value of the touch panel according to the plurality of sensing signals.

10. The touch control system of claim 6, wherein the touch panel comprises a plurality of first sensing electrodes arranged along a first direction and a plurality of second sensing electrodes arranged along a second direction, the driving voltage supplying unit provides the plurality of driving signals to the plurality of first sensing electrodes, and the processing unit receives the plurality of sensing signals from the plurality of second sensing electrodes of the touch panel.

11. The touch control system of claim 6, wherein the touch panel comprises a plurality of first sensing electrodes arranged along a first direction and a plurality of second sensing electrodes arranged along a second direction, the driving voltage supplying unit sequentially provides the plurality of driving signals to the plurality of first sensing electrodes and second sensing electrodes, the processing unit receives the plurality of sensing signals from the plurality of first sensing electrodes and second sensing electrodes of the touch panel.

* * * * *